UNITED STATES PATENT OFFICE.

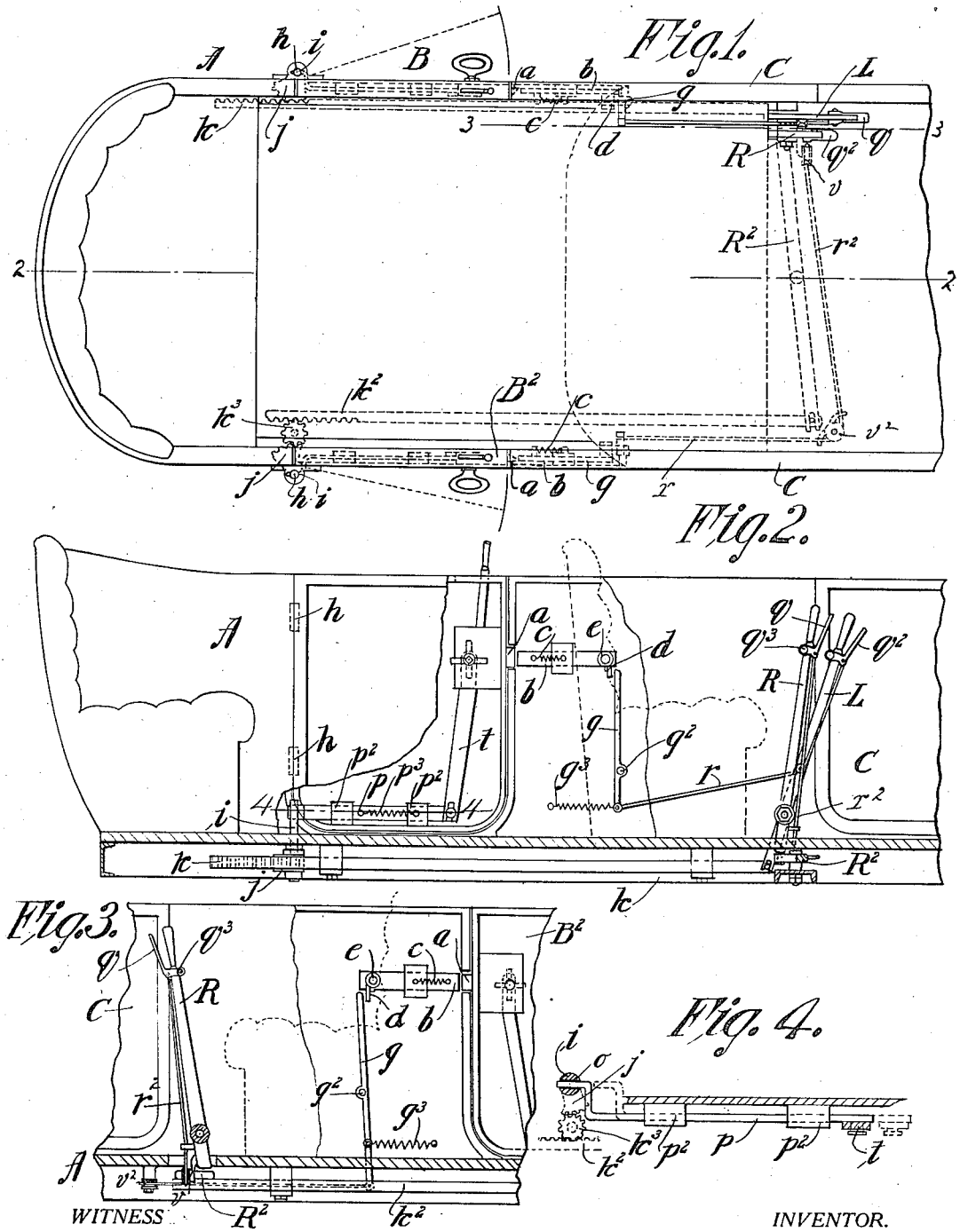

EUDORE F. MEUNIER, OF HOLYOKE, MASSACHUSETTS.

DOOR-OPERATING DEVICE FOR VEHICLES.

1,184,474.

Specification of Letters Patent.

Patented May 23, 1916.

Application filed March 3, 1916. Serial No. 82,329.

*To all whom it may concern:*

Be it known that I, EUDORE F. MEUNIER, a citizen of the United States of America, and resident of Holyoke, in the county of Hampden and State of Massachusetts, have invented certain new and useful Improvements in Door-Operating Devices for Vehicles, of which the following is a full, clear, and exact description.

This invention relates to door operating devices for vehicles and more especially for automobiles.

The object of the invention is to provide means whereby the doors for the tonneau or rear portion of the vehicle body may be operated, from a location forward thereof and conveniently accessible to the chauffeur or driver, by the latter, conducing to the ease and luxury of the occupants of the rear seats.

The invention includes a member movably mounted on the body of a vehicle for pushing the door latching bolt to its unlatching position, and a lever on the body operatively connected with and to operate the door, and means for operating the bolt pushing member so that the closed door may be first unlocked or unlatched, whereupon it is free to be swung open, and thereafter to be swung to closed position by the operating means therefor.

The devices in accordance with this invention are necessarily duplicated for the doors at the opposite sides of the tonneau.

The invention is more particularly described in conjunction with the accompanying drawings and is defined in the claims.

In the drawings:—Figure 1 is a plan view showing portions of an automobile body including that for accommodating the rear seat and a chauffeur's seat showing the devices for unlatching and for operating the opposite doors of the tonneau. Fig. 2 is a sectional elevation as seen beyond the line 2—2, Fig. 1. Fig. 3 is a partial sectional elevation as taken on line 3—3, Fig. 1, looking toward the opposite side of the vehicle body. Fig. 4 is a partial horizontal section on line 4—4, Fig. 2, on a somewhat larger scale.

In the drawings, A represents the body of a vehicle having the opposite doors B and B² at opposite sides of the rear portion or tonneau, and also having the fore doors C C as usual for entrance to the forward part of the body. Each door has its latching bolt $a$ as usual, each latching bolt having therefor means carried by the door for the unlatching thereof.

$b$ represents a bolt pushing member shown as in the form of a bar guided on or within the side of the body forward of the latching edge of the door and adapted to have horizontal longitudinal movements in line, and for engagement with, the latch to force it inwardly from its projecting and locking, to its unlatched, position. Each latch pushing bar $b$ has an abutment $d$ hung on a pivot $e$ near the forward end of the bar. This abutment is free to swing forwardly from its depending position shown in Fig. 1, but it is limited against the swinging rearwardly beyond its normal depending position as by the stop $f$ therefor, formed on or carried as a part of the bar $b$. The spring $c$ is applied to each latch pusher bar to maintain it normally in its forward position to leave the door latching bolt free for its locking projection. Coacting with the abutment $d$ is an upright lever $g$ intermediately pivoted at $g^2$ having a retracting spring $g^3$ for normally maintaining it to swing to its position with its free end forward of the abutment $d$.

Two levers L and R are provided in the forward part of the body, and are here shown as arranged closely alongside each other at the left hand side of the body, the one L being the actuator for the operating means for the left hand door B, and carrying appurtenances of the device for actuating the unlatching means for such door, while the lever R constitutes the actuating means for the opposite or right hand door B² and carries appurtenances of the unlatching device for the latter door.

Beneath and in axial alinement with the hinges $h$ of the doors are upright pintles or rotative posts $i$, each having a sector gear $j$ thereon; and $k$, $k^2$ represent longitudinally ranging rack bars guided for their reciprocatory movements beneath the body, the one $k$ being in mesh with the sector $j$, at the lower end of the pintle at the left hand side of the body while the rack bar $k^2$ is in gear engagement, through the mediary of the pinion $k^3$, with the sector gear which is at the lower end of the pintle under and coincident with the hinge axis of the right hand door.

Each pintle $i$ has a socket slot $o$ transversely therein or therethrough in which detachably engages the extremity of a bar $p$ slidable on or within the door, in guides $p^2$ therefor, and to each bar a spring $p^3$ is applied for maintaining such bar normally in locking engagement with the pintle, and whereby through the medium of the bar the door and pintle are connected so that when the pintle is partially rotated or rocked on its vertical axis, the door will be swung thereby and as one therewith to open and to close, according to the direction of the rotative movement.

The upright pivot lever L has, directly, a stud and slot connection with the rack bar $k$, whereby on drawing the upper end of the lever rearwardly the rack bar is moved forwardly for effecting the door opening action, and vice versa on the opposite movement of such lever. On the levers L and R are supplemental angularly formed levers $q$ and $q^2$ connected by pivots $p^3$. To the elbow of the lever $q$ is a cord, small wire cable or like flexible connection $r$, properly sheave guided at an intermediate part of the lever, and thence rearwardly extended to connection with the lower arm of the aforementioned intermediately pivoted lever $g$, which coacts with the abutment $d$ of the latch pusher $b$ appurtenant to the left hand door.

Now so far as the left hand door is concerned, for its operation the chauffeur will first rearwardly swing the upper arm of the lever $q$, causing, through the draft of the flexible connection $r^2$, the swinging of the lever $g$ which engages the abutment $d$, and before disengaging from such abutment, pushes the bar rearwardly and sufficiently far to place the door latching bolt in released or fully unlatching position; and while such conditions are maintained, the draft rearwardly through the handle member of the lever L causes, through the rack bar and gear connection with the pintle the rotation of the latter and the opening of the door.

At any suitable stage in the operation, as, for instance right after the commencement of the swinging of the lever L, an additional impulse or swinging movement being imparted to the lever $q$ will cause the swinging of the lever $g$ to its maximum extent to trip past or become disengaged from the abutment $d$, whereupon the latch pusher $b$ is free to be forwardly moved to its normal, latch disengaging, position, under the reaction of its retracting spring $c$; and thus provision is made that without care or thought on the part of the operator there will be no impediment as constituted by the rearwardly projected pusher bar to prevent the latching of the door, promptly relocking when the door is swung closed through the reversed movement of the operating lever therefor.

The latch pusher $b$ and its actuating lever $g$ and other appurtenances, as also the rack bar $k^2$ are substantial duplications at the right hand side of the vehicle body to those which have been particularly described in conjunction with the ways and means for the operation thereof; but in order to impart reciprocatory movement to the rack bar $k^2$ which is at the side opposite from the location of the lever R, connection is made by having the lever R engage one end of the intermediately pivoted horizontal transverse lever $R^2$, which lever at its other end has engagement with the rack bar $k^2$; and for the connection between the angular supplemental lever $q^2$, carried at the right hand side of the machine, the flexible connection $r^2$ is guided downwardly along the length of the lever R to or near the lower end thereof, around the sheave $v$ in a plane angular to the lever, thence across under the body and to the right hand side thereof, and by the further sheave $v^2$ guided to connection with the lower end of the lever $g$, which lever $g$ at the right hand side of the vehicle is projected through or below the flooring (see Fig. 3).

While the tonneau doors have the bolt unlatching and door operating means substantially as described, to be actuated by the chauffeur, it is, nevertheless, intended that they shall have their own individual unlatching means carried directly thereby, such means being, for instance, any of the well known handle or lever devices at present employed, and in connection with the unlatching devices directly carried by the doors are lever extensions $t$ to have swinging movements in unison with the door carried unlatching members. Each of these extension levers $t$ is effective, when the door-carried unlatching member is operated, to forwardly draw the extremity of the bar $p$ out from the socket slot of the pintle, whereupon the door is free to be operated by the hand directly applied thereto, and the movement thereof not being obstructed by the connection of the door and pintle, the operation of which latter is expected to be only performed by the chauffeur and through the forwardly located means.

I claim:—

1. The combination with a vehicle body, a door hinged to the body having a latching bolt, and a pintle rotatively mounted on the body axially coincident with the door hinge axis provided with a gear, of a lever mounted to swing on the body, a rack bar with which the lever coacts and to be reciprocated thereby, and which meshes with said gear, a member movably mounted on the body for pushing the bolt to unlatching position, a lever mounted to swing on the body and to coact with the bolt pushing member, a lever supplemental to and mounted on the first named lever and a sheaf guided connection between the last named lever and the bolt pusher lever.

2. The combination with a vehicle body, a door hinged to the body having a latching bolt, and a pintle rotatively mounted on the body axially coincident with the door hinge axis provided with a gear, of a lever mounted to swing on the body, a rack bar with which the lever coacts and to be reciprocated thereby, and which meshes with said gear, a member movably mounted on the body for pushing the bolt to unlatching position, having thereon a pivotal abutment limited against swinging in one direction but free to swing in the opposite direction, and said member having a retracting spring, a lever mounted to swing on the body and to coact with said pivoted abutment, and a retracting spring therefor, a lever supplemental to and mounted on the first named lever, and a sheave guided flexible connection between the last named and the second named levers.

3. The combination with a vehicle body, and a door hinged to the body having a latching bolt, and the door having a rotative pintle axially coincident with the hinge of the door, and means for detachably connecting said pintle and the door, and said pintle being provided with a gear, of a lever mounted to swing on the body, a rack bar with which the lever coacts and to be reciprocated thereby, which rack bar meshes with said gear, a member movably mounted on the body for pushing the bolt to unlatching position, and manually operable means for actuating the bolt pushing member, and bolt unlatching means carried by the door, and coacting with the said door and pintle connecting means, and operable to move said means to disconnect the door and pintle.

4. The combination with a vehicle body, and a door hinged to the body having a latching bolt, and a rotative pintle axially coincident with the hinge of the door, provided with a gear and having a socket slot therein, of a bar slidable on the door and engageable in said slot for detachably connecting said pintle and the door, a lever mounted to swing on the body, a rack bar with which the lever coacts and to be reciprocated thereby, which rack bar meshes with said gear, a member movably mounted on the body for pushing the bolt to unlatching position, and manually operable means for actuating the bolt pushing member, and bolt unlatching means carried by the door, and including a lever coacting with said slidable door provided bar operable to move the latter from engagement with the pintle when the unlatching means directly carried by the door is operated.

5. A vehicle body having a hinged door at one side thereof, such door having a latching bolt therefor, a member movably mounted on the body adjacent the door for pushing the bolt to unlatching position, a lever mounted to swing at the opposite side of the body from the bolt, and the body having at the side opposite the location of said lever, a pintle axially coincident with the hinge of the door at such opposite side, connected with the door, and having a gear thereon, a longitudinally ranging rack bar having a rotating connection with said pintle, a horizontal intermediately pivoted lever, traversing the body of the vehicle, connected to said rack bar and with which said first named lever connects, a supplemental lever on such first named lever, and a lever for actuating the latch pusher,—between which actuating lever and said supplemental lever are flexible sheave guided connections.

6. A vehicle body having a hinged door at the side thereof, having a latching bolt, and a member movably mounted on the body adjacent the door for pushing the bolt to unlatching position, a lever mounted to swing at the side of the body opposite said door, the body having at the side opposite the location of said lever a pintle axially coincident with the hinge of the door at such side, detachable means for connecting said pintle and the door adjacent thereto, a longitudinally ranging rack bar having a rotating connection with said pintle, a horizontal intermediately pivoted lever, traversing the body of the vehicle, connected to said rack bar and with which the said lever connects, a supplemental lever on the first named lever, and a lever for actuating the latch pusher for the door, between which actuating lever and said supplemental lever are flexible sheave guided connections, and a device for operating the means for connecting the pintle and the adjacent door, for the temporary disconnection of the one from the other.

Signed by me at Springfield, Mass., in presence of two subscribing witnesses.

EUDORE F. MEUNIER.

Witnesses:
G. R. DRISCOLL,
WM. S. BELLOWS.